May 7, 1963 P. F. BACHMANN 3,088,331
ADJUSTABLE GAS PEDAL FOR MOTOR VEHICLES
Filed June 26, 1961
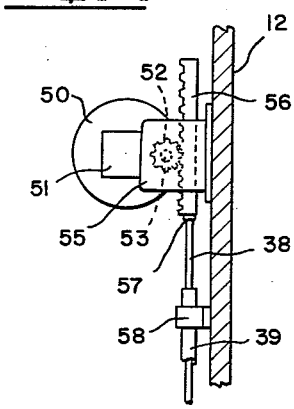
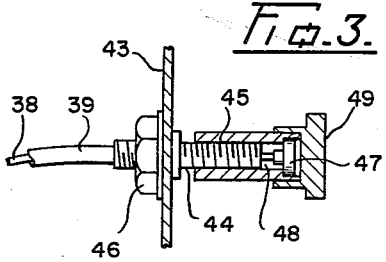
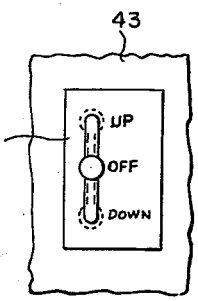
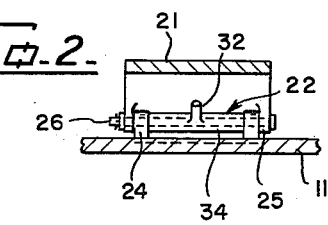
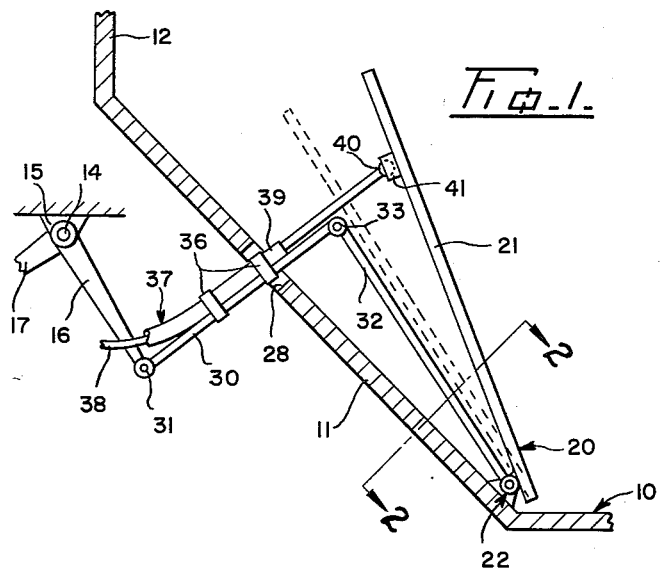
INVENTOR
PHIL F. BACHMANN
By Hugo Ray
Agent

United States Patent Office 3,088,331
Patented May 7, 1963

3,088,331
ADJUSTABLE GAS PEDAL FOR MOTOR VEHICLES
Phil F. Bachmann, R.R. 5, Kelowna,
British Columbia, Canada
Filed June 26, 1961, Ser. No. 119,369
2 Claims. (Cl. 74—513)

When driving an automobile or other vehicle fitted with the conventional gas pedal, most drivers experience a certain amount of discomfort due to the strain of keeping the right foot more or less in the same position. This is particularly noticeable during long distance driving when the continued strain may result in a muscular spasm in the calf of the leg.

The object of the present invention, therefore, is to provide means whereby the angle of the gas pedal can be changed from time to time so as to relieve the leg muscles.

A further object is to enable the pedal to be adjusted according to the type of shoes being worn by the driver. For example a woma wearing high heel shoes could increase the angularity of the gas pedal to permit the foot to rest on the pedal at a more suitable angle than would otherwise be possible.

These and other objects will appear in the following specification and be shown in the accompanying drawings.

Referring to the drawings:

FIGURE 1 is a side elevation of the invention with parts of the vehicle being shown in section.

FIGURE 2 is a section taken on the line 2—2 of FIGURE 1.

FIGURE 3 is an elevation, part in section, of the dashboard end of the flexible cable.

FIGURE 4 is side elevation of a modified form of the invention.

FIGURE 5 is a front elevation of the dashboard switch of the modification.

In the drawings like characters of reference indicate corresponding parts in each figure.

The numeral 10 indicates the floor panel of a motor vehicle and 11 indicates the inclined portion of said panel which extends to the bulkhead or firewall 12. In the vicinity of the wall 12, a transverse shaft 14 is journalled as at 15 and is fitted with crank arms 16 and 17. The arm 17 is connected to the linkage of the throttle valve on the carburetor and incorporated in said linkage is the usual spring, not shown, which urges the arm 16 towards the floor panel portion 11.

The adjustable gas pedal 20 consists of a foot plate 21 which is hingedly supported at its lower end by means of a structure 22. Preferably the hinge structure is made up of a pair of spaced bearings 24 which are fastened to the portion 11 and are straddled by bearings 25 depending from the underside of the plate 21. A hinge pin 26 extends through the bearings 24 and 25.

Extending through an opening 28 in the portion 11 is an arm 30 having its lower end connected by a pivot pin 31 to the crank arm 16 For added rigidity, a reinforcing bar 32 is secured to the arm 30 by a pivot pin 33 and the lower end of said bar has a transversely extending sleeve 34 which is rotatably mounted on the pivot pin 26 of the hinge structure.

Fastened to the arm 30 by means of clips 36 is one end of a length of flexible cable 37 made up of a push-pull rod 38 enclosed in a sheath 39. The sheath terminates above the upper clip 36 so as to expose an end of the rod 38 and the rod end is fitted with a ball 40 which is received in a socket 41 secured to the underside of the plate 21.

The cable 37 extends upwardly along the front face of the wall 12 and at some suitable point passes through said wall so as to reach the dashboard 43, see FIGURE 3. The end of the sheath 39 is fitted with a flanged sleeve 44 having a multiple thread 45. A nut 46 clamps the sleeve to the dashboard and projecting through said sleeve is the end of the push-pull rod 38 which is fitted with a collar 47. The collar 47 is rotatably housed within the bore 48 of a knurled knob 49 which knob is internally threaded to engage the thread 45 on the sleeve 44. By backing off the knob 49 on the sleeve 44, the foot plate 21 is adapted to be moved from the solid to the dotted line positions of FIGURE 1 and of course, may be selectively disposed in any position therebetween.

In the modification shown in FIGURE 4, the wall 12 is fitted with a suitable motor 50, preferably a small electric motor of the reversible type. The motor has a reducer 51 provided with an output shaft 52 and mounted on said shaft is a pinion 53. A housing 55 encloses the pinion 53 and also slidably supports a vertically movable rack 56 which is engaged by the pinion. The lower end of the rack is secured as at 57 to the rod 38 and the adjacent end of the sheath 39 is secured to the wall 12 by a fastener 58.

The motor 50 is provided with a suitable electric circuit whereby said motor may be energized to rotate in the appropriate direction and to very slowly move the rack 56 either up or down in its housing. Since such circuits are well known no detailed description will be given but in this instance the circuit includes a reversing switch 60 which is mounted on the dashboard 43 as shown in FIGURE 5.

At the start of a trip the foot plate 21 is adjusted to a position which is most comfortable for the drivers height and, particularly in the case of a woman driver, for the style of shoes being worn. Pressure applied to the foot plate is transmitted from the cable 37 to the arm 30, thence to the throttle valve linkage in the normal way.

When the driver feels the need to change the position of his foot the knob 48 is manipulated or, in the case of the modification, the switch 60 is actuated to move the plate 21 towards or away from the arm 30. It has been found that a very slight change in the angle at which the foot meets the accelerator pedal is sufficient to give temporary relief to the leg muscles. Periodic changes in the position of the plate are normally required to achieve the same effect during long trips.

What I claim as my invention is:

1. In an adjustable gas pedal for a motor vehicle having a floor panel and a throttle valve operated through a system of linkage, the combination of a foot plate hingedly mounted on the floor panel, a link freely extending through an opening in the floor panel and being operatively connected to the throttle valve linkage and having an upper end disposed beneath the foot plate, a flexible cable having a sheath, said sheath being secured at one end to the link and being secured at the opposite end to a part of the motor vehicle near the operator, said flexible cable including a push-pull rod, means pivotally connecting one end of the push-pull rod to the underside of the foot pedal and means on the opposite end of the push-pull rod whereby said rod may be moved relative to the sheath to adjust the angularity of the foot plate with respect to the floor panel.

2. In an adjustable gas pedal for a motor vehicle having a floor panel, a wall adjoining the floor panel and a throttle valve operated through a system of linkage, the combination of a foot plate hingedly mounted on the floor panel, a link freely extending through an opening in the floor panel and being operatively connected to the throttle valve linkage, a reversible electric motor carried by the wall and having an output shaft, a reciprocating member slidably mounted on the wall, a drive train connecting the output shaft to the reciprocating member, a flexible cable having a sheath, said sheath being secured at one end to the wall and at the other end to the link, said flexible cable having a push-pull rod, said push-pull rod operatively connecting the reciprocating member to the foot plate and a switch included in the motor circuit and being accessible to the operator of the motor vehicle for actuating the motor whereby to move the push-pull rod relative to the sheath and selectively adjust the angularity of the foot pedal with respect to the floor panel.

References Cited in the file of this patent

UNITED STATES PATENTS

| | | |
|---|---|---|
| 1,248,592 | Anderson | Dec. 4, 1917 |
| 2,072,285 | Walker | Mar. 2, 1937 |
| 2,860,720 | Huff et al. | Nov. 18, 1958 |
| 2,908,183 | Di Giovanni | Oct. 3, 1959 |
| 2,979,172 | Eshbaugh et al. | Apr. 11, 1961 |